United States Patent
Bow

(10) Patent No.: US 8,220,820 B2
(45) Date of Patent: Jul. 17, 2012

(54) TRAILER HITCH IMMOBILIZER

(75) Inventor: James G. Bow, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 12/607,380

(22) Filed: Oct. 28, 2009

(65) Prior Publication Data

US 2011/0095509 A1 Apr. 28, 2011

(51) Int. Cl.
*B60D 1/60* (2006.01)

(52) U.S. Cl. .................................................. 280/507

(58) Field of Classification Search .................. 280/507, 280/504, 491.5, 508, 477, 493; 70/158, 258, 70/57, 237
See application file for complete search history.

(56) References Cited

U.S. PATENT DOCUMENTS

| | | | |
|---|---|---|---|
| 2,934,184 A * | 4/1960 | Moser | 403/295 |
| 3,782,761 A * | 1/1974 | Cardin, Sr. | 280/507 |
| 4,538,827 A | 9/1985 | Plifka | |
| 4,571,964 A | 2/1986 | Bratzler | |
| 5,195,339 A | 3/1993 | Nee et al. | |
| 6,053,627 A | 4/2000 | Vo et al. | |
| D425,460 S * | 5/2000 | Peroni | D12/162 |
| D426,798 S | 6/2000 | Peroni | |
| 6,260,874 B1 * | 7/2001 | Smith et al. | 280/507 |
| 6,971,663 B1 * | 12/2005 | Blake | 280/507 |
| 6,976,695 B1 | 12/2005 | Smith, III | |
| 7,059,158 B2 * | 6/2006 | Freeman | 70/34 |
| 7,455,313 B2 | 11/2008 | Yokosh et al. | |
| D623,099 S * | 9/2010 | Wise | D12/162 |
| 2003/0141699 A1 * | 7/2003 | Collins | 280/507 |
| 2004/0080141 A1 * | 4/2004 | Hart | 280/507 |
| 2006/0214392 A1 * | 9/2006 | Staggs | 280/507 |
| 2007/0222186 A1 * | 9/2007 | Yokosh et al. | 280/507 |

* cited by examiner

*Primary Examiner* — Tashiana Adams
(74) *Attorney, Agent, or Firm* — Gigette M. Bejin; Greg P. Brown

(57) ABSTRACT

A trailer hitch immobilizer is provided. The trailer hitch immobilizer includes a first face operatively configured to block an aperture defined by a hitch receiver. The first face is substantially perpendicular to an inner surface of the hitch receiver. A second face is also provided where the second face is integral to the first face. The second face is substantially perpendicular to the first face. A third face is also provided where the third face is integral to the first face. The third face is substantially perpendicular to the first face.

3 Claims, 2 Drawing Sheets

TRAILER HITCH IMMOBILIZER

BACKGROUND

The present disclosure relates generally to a lock out device, including a lock out device for a trailer hitch.

Vehicles such as autos, trucks, recreational vehicles, sports utility vehicles and the like are often equipped with a vehicle trailer hitching socket which is located near a rear bumper thereof, (typically positioned below said rear bumper). A standard vehicle trailer hitching socket is on the order of two inches square, or one inch by two inches rectangular. The purpose of said vehicle trailer hitching socket is primarily to allow attaching trailers to the vehicle for towing. Trailers typically have a socket member, in use, is caused to mate with a ball member. The ball member is attached to a tongue element which is of a shape and size to allow the ball member to slide into the vehicle trailer hitching socket. The ball member is secured in place by a securing member. When unused, however, it has been noted that a vehicle trailer hitching socket presents a means for attaching things other than a trailer to said vehicle, such as but not limited to a vehicle bike rack.

Locks associated with the trailer hitch typically involve a device which prevents a third party from de-coupling a trailer from the towing vehicle. For example, U.S. Pat. No. 4,571,964 issued to Bratzel discloses an elongated locking assembly which prevents the theft of or unauthorized use of a trailer having a socket type hitch. Another form of a trailer hitch lock is disclosed in U.S. Pat. No. 5,195,339 which prevents unauthorized hitching or movement of the trailer. The lock assembly disclosed U.S. Pat. No. 5,195,339 includes an elongated cylindrical housing which is opened at each end thereof. The housing is secured in a closed relationship around the socket end of the trailer hitch.

Although several devices in the prior art prevent an unauthorized user from decoupling the trailer from the towing vehicle, there are no devices which prevent any use of the trailer hitch on a towing vehicle.

SUMMARY

A trailer hitch immobilizer is provided according to embodiment(s) disclosed herein. The trailer hitch immobilizer includes a first face operatively configured to block an aperture defined by a hitch receiver. The first face is substantially perpendicular to an inner surface of the hitch receiver and prevents a user from inserting a ball mount or the like in the trailer hitch receiver. A second face is also provided where the second face is integral to the first face. The second face is substantially perpendicular to the first face and engages with the trailer hitch receiver. A third face is also provided where the third face is integral to the first face. The third face is substantially perpendicular to the first face and also engages with the trailer hitch receiver.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure provides a device which prevents usage of a trailer hitch receiver on a towing vehicle.

Figure 1:
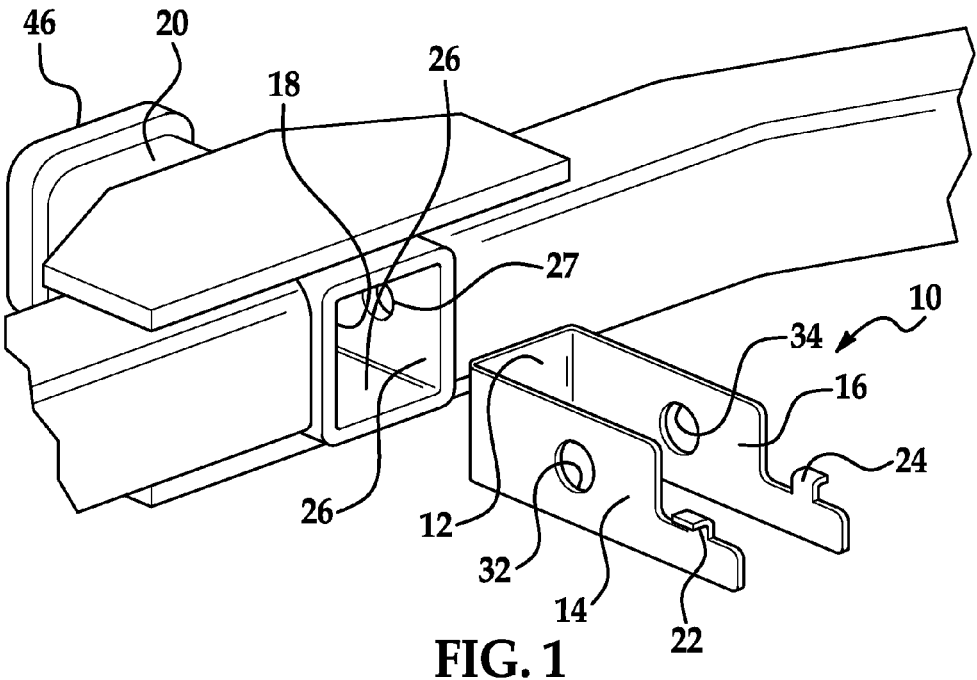
FIG. 1 is a partial perspective view of one embodiment the immobilizer bracket and the trailer hitch receiver prior to installation.

Referring now to FIG. 1, an embodiment of the trailer hitch immobilizer 10 is shown. The trailer hitch immobilizer 10 is a non-flexible or rigid bracket which may be made out of HRLC (Hot Rolled Low Carbon) Steel, or the like. The bracket may have a uniform thickness in the range of approximately 0.165 inches to 0.195 inches. As shown in FIG. 1, the trailer hitch immobilizer may be inserted into the trailer hitch receiver from the front open end 44 of the trailer hitch receiver. The trailer hitch immobilizer may be inserted in front open end 44 and pushed rearward in order to lock the trailer hitch immobilizer 10 into place. Depending on the vehicle configuration, a user may be required to remove the spare tire (not shown) which may be affixed to the underside of the vehicle in order to access front open end 44 of the trailer hitch receiver 20.

Although it is possible to insert the trailer hitch immobilizer 10 into the rear open end 46 of the trailer hitch receiver, a user will be required to push the trailer hitch immobilizer 10 along the inner length of the trailer hitch receiver 20 in order to get the trailer hitch immobilizer 10 to lock into place.

The trailer hitch immobilizer 10 includes a first face 12, a second face 14 and a third face 16 wherein the first face 12 is integral to the second face 14 and the third face 16. The first face 12 is operatively configured to block an aperture 18 defined by a hitch receiver 20. The width and the height of the first face 12 may be slightly smaller than the width and the height of the aperture 18 or the inner surface 26 of the hitch receiver 20 so that the first face 12 may be disposed within the aperture of the hitch receiver 20. However, the first face 12 is sufficiently wide enough and tall enough to block objects from entering the interior of the hitch receiver 20. The first face 12 is substantially perpendicular to an inner surface 26 of the hitch receiver 20 when the trailer hitch immobilizer 10 is disposed within the hitch receiver 20.

Figure 2:
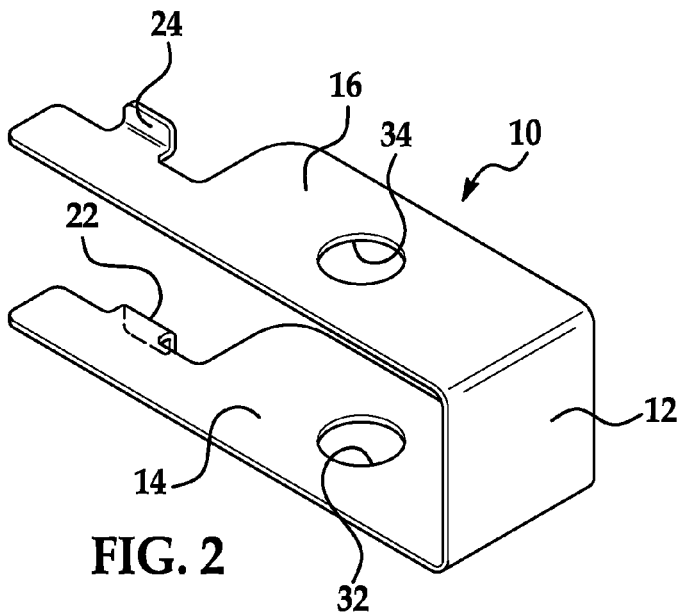
FIG. 2 is a perspective view of an embodiment of the trailer hitch receiver.
Figure 3:
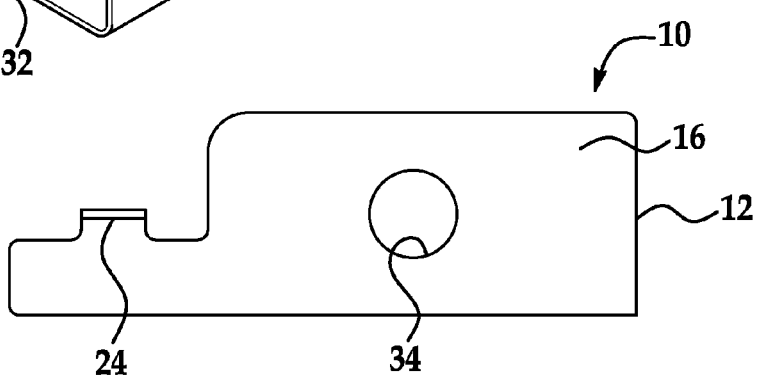
FIG. 3 is a side view of an embodiment of the trailer hitch receiver.

As shown in FIG. 2, the second face 14 of the trailer hitch immobilizer 10 is integral to a first side of the first face 12. As shown in FIGS. 1 and 2, the second face 14 may be formed by bending the bracket so that the second face 14 is substantially perpendicular to the first face 12. Similarly, as shown, a third face 16 is integral to a second side of the first face 12. The third face 16 may be formed by bending the bracket so that the third face 16 is substantially perpendicular to the first face 12. When the trailer hitch immobilizer 10 is disposed within the hitch receiver 20 of FIG. 1, the second face 14 and the third face 16 are each adjacent to the corresponding inner surface 26 of the hitch receiver 20.

Figure 4:
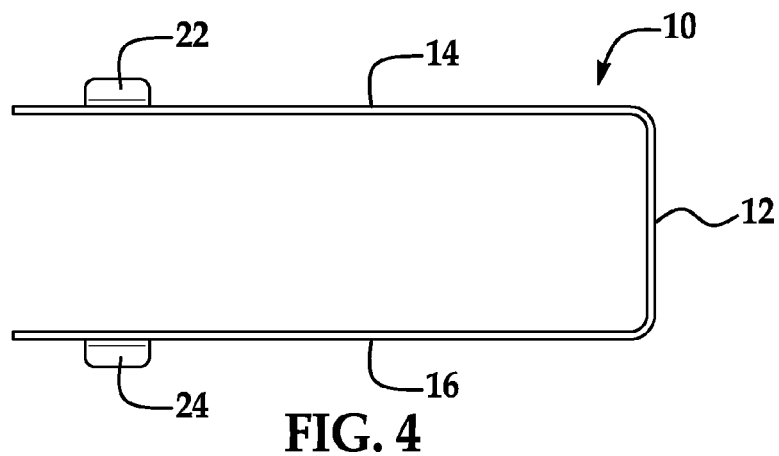
FIG. 4 is a top view of an embodiment of the trailer hitch receiver.
Figure 5:
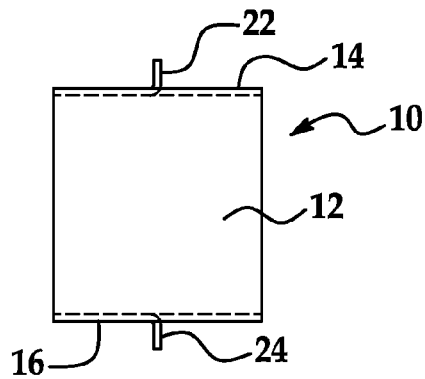
FIG. 5 is a rear view of an embodiment of the trailer hitch receiver.

Referring now to FIGS. 2 and 4, the trailer hitch immobilizer 10 of the present disclosure includes a second face locking tab 22 defined in the second face 14. The second face locking tab 22 may be perpendicular to the second face 14 as shown in the non-limiting example of FIGS. 2 and 4. Referring again to FIGS. 2 and 4, the trailer hitch immobilizer 10 may also include a third face locking tab 24 wherein the third face locking tab 24 is perpendicular to the third face 16.

Upon inserting the trailer hitch immobilizer 10 into the trailer hitch receiver 20, the second face locking tab 22 engages with the inner surface 26 of the trailer hitch receiver 20 that is directly adjacent to the second face 14. It is to be understood that the inner surface 26 of the trailer hitch receiver 20 may further define a second side aperture which is operatively configured to engage with second locking face tab. The engagement between the second locking face tab and the trailer hitch receiver 20 prevents removal of the trailer hitch immobilizer 10 from the trailer hitch receiver 20.

Similar to the second face locking tab 22, upon inserting the trailer hitch immobilizer 10 into the trailer hitch receiver 20, the third face locking tab 24 engages with the inner surface 26 (such as an aperture (not shown) defined on the inner surface of the trailer hitch receiver 20) of the trailer hitch receiver 20 that is directly adjacent to the third face 16. It is to be understood that the inner surface 26 of the trailer hitch receiver 20 may further define a third side aperture which is operatively configured to engage with third face locking tab 24. The engagement between the third face locking tab 24 and the trailer hitch receiver 20 prevents removal of the trailer hitch immobilizer 10 from the trailer hitch receiver 20.

Referring back to FIG. 2, the second face 14 and the third face 16 may each define an opening 32, 34. The openings 32, 34 that are defined in the second face 14 and the third face 16 constitute clearance holes which assure that the bracket cannot be removed by simply squeezing the bracket to disengage the tabs. Therefore, with the clearance holes (or openings 32, 34) in place, a user can not squeeze or deform the immobilizer 10 in order to disengage the trailer hitch immobilizer 10 from the trailer hitch receiver 20. The openings 32, 34 in the trailer hitch immobilizer 10 may be aligned with holes (27) in the trailer hitch receiver 20.

Figure 6:
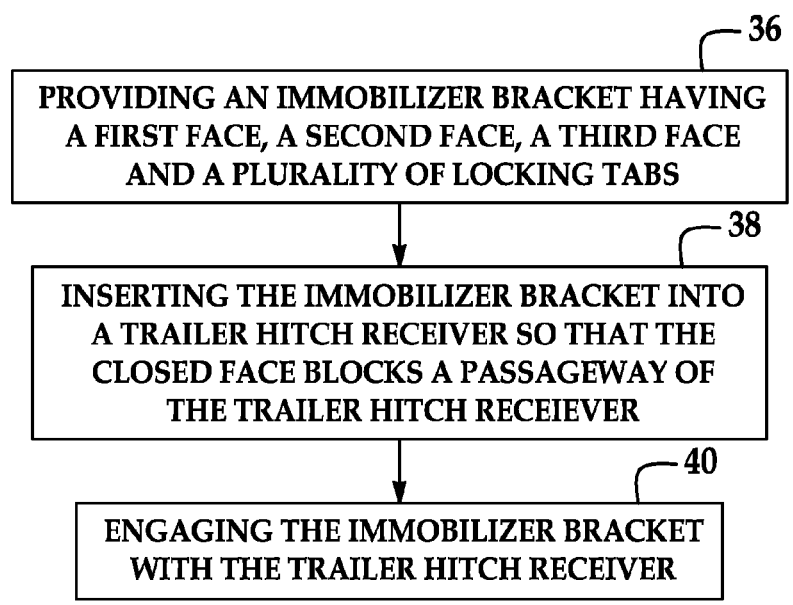
FIG. 6 is a flow chart illustrating an embodiment of a method for immobilizing a trailer hitch receiver.

With reference to FIG. 6, a flow chart illustrates an embodiment of the method for immobilizing a trailer hitch receiver 20. The method includes the step of providing an immobilizer bracket having a first face, a second face, a third face and a plurality of locking tabs. (step 36) The next step of the method includes inserting the immobilizer bracket into a trailer hitch receiver so that the closed face blocks a passageway of the trailer hitch receiver. (step 38) The last step of the method includes the step of engaging the immobilizer bracket with the trailer hitch receiver. (step 40) It is to be understood that a separate tool, such as but not limited to adjustable pliers, vice grips, beveled punch tool or the like, may be used to insert the trailer hitch immobilizer 10 into the trailer hitch receiver 20. The separate tool may also be used to assist in engaging the tabs of the trailer hitch immobilizer 10 with the apertures 27 of the trailer hitch receiver 20.

While multiple embodiments have been described in detail, it will be apparent to those skilled in the art that the disclosed embodiments may be modified. Therefore, the foregoing description is to be considered exemplary rather than limiting.

What is claimed is:

1. A method for immobilizing a unitary trailer hitch, the method comprising:
providing an immobilizer bracket having a first face, a resilient second face, a resilient third face and a plurality of locking tabs;
inserting the immobilizer bracket into a trailer hitch receiver so that the resilient second and third faces and the plurality of locking tabs are disposed entirely within the trailer hitch receiver; and
engaging the immobilizer bracket with the trailer hitch receiver so that the plurality of locking tabs are partially disposed outside of the trailer hitch receiver.

2. The method as defined in claim 1 wherein a second face locking tab is integral to the resilient second face and a third face locking tab is integral to the resilient third face.

3. The method as defined in claim 1 wherein the resilient second face and the resilient third face are each adjacent to an inner surface of the hitch receiver when the plurality of locking tabs are partially disposed outside of the trailer hitch.

* * * * *